H. L. JOHNSTON.
MEAT CHOPPER AND THE LIKE.
APPLICATION FILED JAN. 29, 1915.
1,219,557.
Patented Mar. 20, 1917.
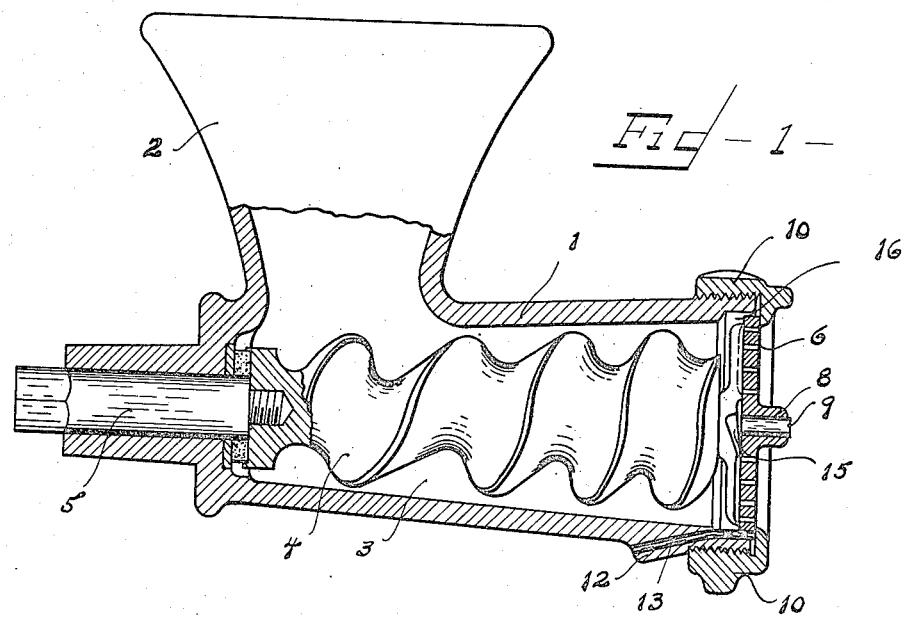
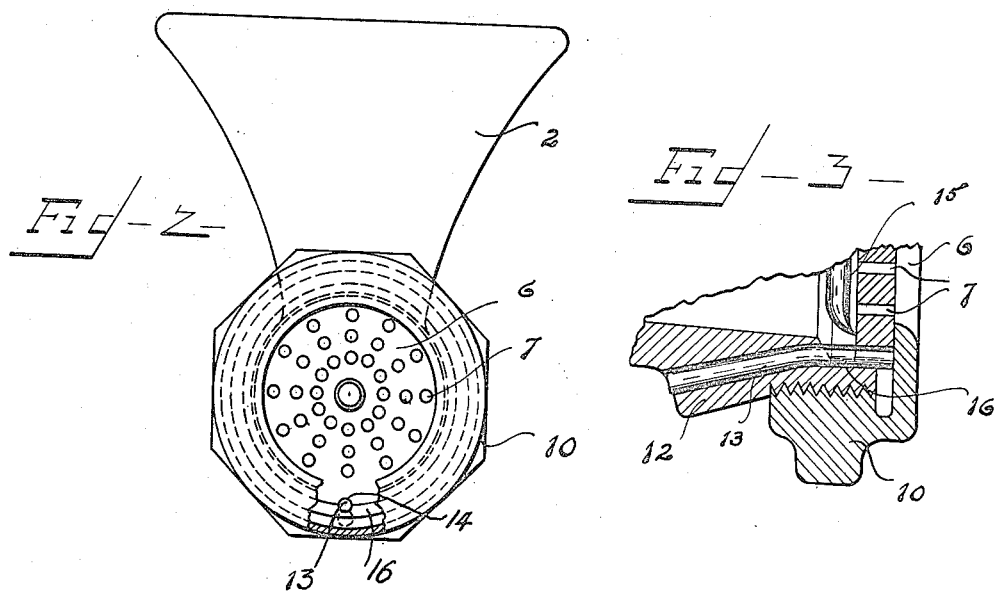
Witnesses
Marie T. Curri.
N. Smith.
Inventor
Herbert L. Johnston
by Allen & Allen
Attorneys

UNITED STATES PATENT OFFICE.

HERBERT L. JOHNSTON, OF TROY, OHIO, ASSIGNOR TO THE HOBART MANUFACTURING COMPANY, OF TROY, OHIO, A CORPORATION OF OHIO.

MEAT-CHOPPER AND THE LIKE.

1,219,557.   Specification of Letters Patent.   Patented Mar. 20, 1917.

Application filed January 29, 1915.   Serial No. 5,131.

*To all whom it may concern:*

Be it known that I, HERBERT L. JOHNSTON, a citizen of the United States, residing at Troy, in the county of Miami and State of Ohio, have invented certain new and useful Improvements in Meat-Choppers and the like, of which the following is a full, clear, and exact description, reference being had to the accompanying drawing, forming part of this specification.

My invention relates to meat choppers of the type wherein there is a casing, a feed worm, a knife and a perforated plate. The feed worm advances the meat along and through the casing, forcing it through the perforations of the plate while the knife, which revolves with the worm and against the plate, cuts the meat as it is forced into the perforations. In a machine of this character the perforated plate has a tendency to revolve due to the friction of the knife against it, which tendency to revolve is overcome by inserting a pin into the chopper case so that it engages in a notch in the periphery of the plate, thus constituting a loose key. These pins are ordinarily driven into holes in the casing, which holes are closed in the bottom. It is necessary that these pins should be tight fits in such holes with the result that when properly inserted they are extremely difficult to remove. These pins are not only driven firmly into place when the chopper is first assembled, but rust also forms on the pin, further cementing it into the hole.

It is the object of my invention to provide a simple, effective and inexpensive way to secure the locking pin so that this difficulty is obviated, and the pin when worn may be readily and easily removed.

My invention consists of that certain novel construction and arrangement of parts, to be hereinafter more specifically pointed out and claimed, in which a boss on the casing is provided with an opening from the rear into the pin socket so that the worn pin may be readily driven out.

In the drawings,

Figure 1 is a longitudinal vertical section of the meat chopper complete.

Fig. 2 is an end elevation of the same looking toward the chopper plate.

Fig. 3 is an enlarged sectional detail of the locking pin construction.

The meat chopper is provided with a casing "1" having a hub portion "2" and a chamber "3" for the worm "4", one end of which is secured to the operating shaft "5" journaled in the casing. The larger end of the casing is closed by a chopper plate "6" provided with a series of holes "7" and the center of the chopper plate is formed with a hub "8" to serve as a bearing for the stud "9" which supports the outer end of the worm. The outer end of the casing is threaded exteriorly to receive the tightening cap "10" by means of which the chopper plate "6" is held in place. Between the chopper worm "4" and the chopper plate "6" there lies a rotating knife "15" driven by a squared portion of the stud "9" and with its edges rubbing tightly against the inner face of the plate "6".

For the purpose of holding the chopper plate from rotating, it is usual to form a notch in the periphery of the chopper plate and to insert a locking pin, and as heretofore stated the usual method is to provide a socket in the end of the casing to hold this pin. To avoid the difficulty experienced when this locking pin becomes rusted in its socket I provide a boss "12" and drill an opening from the base of the usual socket entirely through the boss. A bent pin "13" is then provided of sufficient length to extend from the outer face of the chopper plate partially or entirely through the socket.

The plate "6" is a loose fit in the counterbored portion "16" of the casing, and the notch in the plate is also a loose fit on the locking pin "13" so that the plate "6" can be readily removed from the casing after the tightening ring "10" has been removed.

To lock the chopper plate in the casing, the chopper plate is turned to bring the notch "14" at the edge of the plate in alinement with the opening with the bent pin "13" inserted and driven home flush with the face of the chopper plate and with its other end extending through the opening drilled in the boss 12.

With this construction the pin when worn may be readily and easily drawn out by tapping on its inner end directly with a hammer, or a nail or punch may be used for this purpose and the difficulty met with in removing the ordinary locking pin is entirely obviated.

Having thus described my invention, what I claim as new and desire to secure by Letters Patent is:

1. In a meat chopper, a casing, a worm mounted in the casing, and a chopper plate to close the mouth of the casing, a socket in the end face of the casing, with the periphery of the chopper plate notched to register with the socket, and a rigid, nonbendable pin seated in the socket and engaging said notch to prevent the chopper plate from turning with relation to the casing, said casing being provided with an opening from the rear into the base of the socket to permit access to the inner end of the pin, for driving it out of place in the socket and notch.

2. In a meat chopper, a casing, a worm mounted in the casing, and a chopper plate to close the mouth of the casing, a socket in the end face of the casing, with the periphery of the chopper plate notched to register with the socket, and a rigid, nonbendable pin seated in the socket and engaging said notch to prevent the chopper plate from turning with relation to the casing, said casing being provided with an opening from the rear into the base of the socket to permit access to the inner end of the pin, for driving it out of place in the socket and notch, said opening being made to enter the socket at an angle at the base of the socket to prevent the pin from falling through the socket.

3. In a meat chopper, a casing, a worm mounted in the casing, and a chopper plate to close the mouth of the casing, a socket in the end face of the casing, with the periphery of the chopper plate notched to register with the socket, and a rigid and nonbendable pin seated in the socket and engaging said notch to prevent the chopper plate from turning, with a boss on said casing provided with an opening through the boss and extending into the base of the socket to permit access to the inner end of the pin.

4. A device for preventing the rotation of the chopper plate of a meat chopper together with the worm thereof, comprising, in combination with the casing of the chopper and the plate, the casing having a bent socket, and the plate having a notch registering therewith, a rigid, nonbendable pin shaped to fit into the socket, and having an end which is adapted to lie in the notch, said socket being open at the rear end so that the pin may be driven out when rusted in with the juices of meats chopped in the machine.

HERBERT L. JOHNSTON.

Witnesses:
R. H. WHITE,
I. E. AGNA.